United States Patent
Kimura

(10) Patent No.: US 10,366,689 B2
(45) Date of Patent: Jul. 30, 2019

(54) COMMUNICATION ROBOT

(71) Applicant: KYOCERA Corporation, Kyoto (JP)

(72) Inventor: Masami Kimura, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/521,225

(22) PCT Filed: Oct. 29, 2015

(86) PCT No.: PCT/JP2015/080618
§ 371 (c)(1),
(2) Date: Apr. 21, 2017

(87) PCT Pub. No.: WO2016/068262
PCT Pub. Date: May 6, 2016

(65) Prior Publication Data
US 2017/0352351 A1    Dec. 7, 2017

(30) Foreign Application Priority Data

Oct. 29, 2014  (JP) .................. 2014-220346
Oct. 29, 2014  (JP) .................. 2014-220503
Oct. 29, 2014  (JP) .................. 2014-220504

(51) Int. Cl.
*G06N 3/00* (2006.01)
*G10L 15/22* (2006.01)
(Continued)

(52) U.S. Cl.
CPC ............... *G10L 15/22* (2013.01); *A63H 3/28* (2013.01); *A63H 5/00* (2013.01); *A63H 11/00* (2013.01);
(Continued)

(58) Field of Classification Search
CPC ..................... G06N 3/008; A63H 2200/00
See application file for complete search history.

(56) References Cited

U.S. PATENT DOCUMENTS 8,996,429 B1 *  3/2015  Francis, Jr. ............ G06N 3/008
                                                        706/12
2002/0138175 A1 *  9/2002  Fujita ..................... G06N 3/008
                                                        700/245
(Continued)

FOREIGN PATENT DOCUMENTS

JP    2001-242780 A    9/2001
JP    2002-351305 A    12/2002
(Continued)

OTHER PUBLICATIONS

International Search Report issued in PCT/JP2015/080618; dated Jan. 26, 2016.

*Primary Examiner* — Bryan S Blankenagel
(74) *Attorney, Agent, or Firm* — Studebaker & Brackett PC

(57) ABSTRACT

A communication robot includes a housing and a speaker. The communication robot performs a motion of emitting a sound including a particular phoneme. With such a configuration, it is possible to provide a new communication robot that contributes to the development of the listening ability of languages. For example, the communication robot may include a storage. The communication robot may be configured to determine a motion to be performed based on the information of the storage.

35 Claims, 3 Drawing Sheets

(51) Int. Cl.
  *A63H 5/00* (2006.01)
  *G09B 19/06* (2006.01)
  *G06F 3/041* (2006.01)
  *G10L 17/00* (2013.01)
  *G10L 17/04* (2013.01)
  *G10L 25/78* (2013.01)
  *H04R 1/02* (2006.01)
  *A63H 3/28* (2006.01)
  *A63H 11/00* (2006.01)
  *B25J 11/00* (2006.01)
  *B25J 13/08* (2006.01)
  *B25J 19/02* (2006.01)
  *G10L 13/00* (2006.01)
  *G10L 25/63* (2013.01)

(52) U.S. Cl.
  CPC .......... *B25J 11/001* (2013.01); *B25J 13/089* (2013.01); *B25J 19/023* (2013.01); *G06F 3/0412* (2013.01); *G06N 3/008* (2013.01); *G09B 19/06* (2013.01); *G10L 17/005* (2013.01); *G10L 17/04* (2013.01); *G10L 25/78* (2013.01); *H04R 1/025* (2013.01); *H04R 1/028* (2013.01); *A63H 2200/00* (2013.01); *G06F 2203/011* (2013.01); *G10L 13/00* (2013.01); *G10L 25/63* (2013.01)

(56) References Cited

U.S. PATENT DOCUMENTS

| | | | | |
|---|---|---|---|---|
| 2003/0130851 A1* | 7/2003 | Nakakita | A63H 3/28 | 704/275 |
| 2004/0067471 A1* | 4/2004 | Bennett | G09B 19/04 | 434/167 |
| 2004/0104702 A1* | 6/2004 | Nakadai | B25J 13/00 | 318/568.12 |
| 2006/0111902 A1* | 5/2006 | Julia | G09B 5/06 | 704/236 |
| 2007/0192910 A1* | 8/2007 | Vu | B25J 5/007 | 700/245 |
| 2008/0077277 A1* | 3/2008 | Park | G06N 3/008 | 700/245 |
| 2009/0055019 A1* | 2/2009 | Stiehl | B25J 9/1671 | 700/249 |
| 2010/0228549 A1* | 9/2010 | Herman | G10L 13/033 | 704/260 |
| 2011/0054691 A1* | 3/2011 | Lee | A01M 29/06 | 700/259 |
| 2011/0118870 A1* | 5/2011 | Sugihara | A63H 11/20 | 700/245 |
| 2013/0030789 A1* | 1/2013 | Dalce | G06F 17/289 | 704/2 |
| 2013/0078600 A1* | 3/2013 | Fischer | G09B 19/00 | 434/236 |
| 2013/0130212 A1* | 5/2013 | Dohring | G09B 19/06 | 434/157 |
| 2014/0002464 A1* | 1/2014 | Furukawa | G10L 21/10 | 345/474 |
| 2014/0149177 A1* | 5/2014 | Frank | G06Q 10/06 | 705/7.29 |
| 2014/0272821 A1* | 9/2014 | Pitschel | G09B 19/06 | 434/157 |
| 2015/0066474 A1* | 3/2015 | Yi | G06F 17/277 | 704/8 |
| 2015/0127349 A1* | 5/2015 | Agiomyrgiannakis | G10L 15/142 | 704/266 |
| 2015/0138333 A1* | 5/2015 | DeVaul | G06F 3/013 | 348/78 |
| 2015/0255069 A1* | 9/2015 | Adams | G10L 15/08 | 704/236 |
| 2015/0356349 A1* | 12/2015 | Govindarajeswaran | G06K 9/00308 | 382/103 |
| 2016/0034050 A1* | 2/2016 | Ady et al. | G06F 1/3231 | 345/619 |
| 2017/0287474 A1* | 10/2017 | Maergner | G10L 13/08 | |

FOREIGN PATENT DOCUMENTS

| | | |
|---|---|---|
| JP | 2005-342862 A | 12/2005 |
| JP | 2006-068489 A | 3/2006 |
| JP | 2006-123136 A | 5/2006 |
| JP | 2007-021719 A | 2/2007 |
| JP | 2011-000681 A | 1/2011 |
| JP | 2013-099823 A | 5/2013 |
| JP | 2013-237124 A | 11/2013 |

* cited by examiner

COMMUNICATION ROBOT

CROSS-REFERENCE TO RELATED APPLICATION

The present application claims priority under 35 U.S.C. Section 119 to Japanese Patent Application No. 2014-220346 filed on Oct. 29, 2014, entitled "COMMUNICATION ROBOT", Japanese Patent Application No. 2014-220503 filed on Oct. 29, 2014, entitled "COMMUNICATION ROBOT", and Japanese Patent Application No. 2014-220504 filed on Oct. 29, 2014, entitled "COMMUNICATION ROBOT". The contents of which are incorporated by reference herein in their entirety.

FIELD

This disclosure relates to a communication robot.

BACKGROUND

It is known that a communication robot that communicates with a human opponent calculates the degree of intimacy with a human as a counterpart and changes the content of an utterance according to the calculated numerical value.

It is known that a communication robot is controlled so as to perform emotion recognition by recognizing a facial image of a counterpart and reading a facial expression and to take an action according to the recognition result.

SUMMARY

A communication robot according to one embodiment of this disclosure includes a housing, and a speaker. A motion of emitting a sound including a particular phoneme is performed.

DESCRIPTION OF EMBODIMENTS

One embodiment of this disclosure is described below. The conventionally known communication robot is not assumed at all that the communication robot is utilized for the development of listening ability of language.

Embodiments of the present disclosure focus this point and provide a new communication robot.

Figure 1:
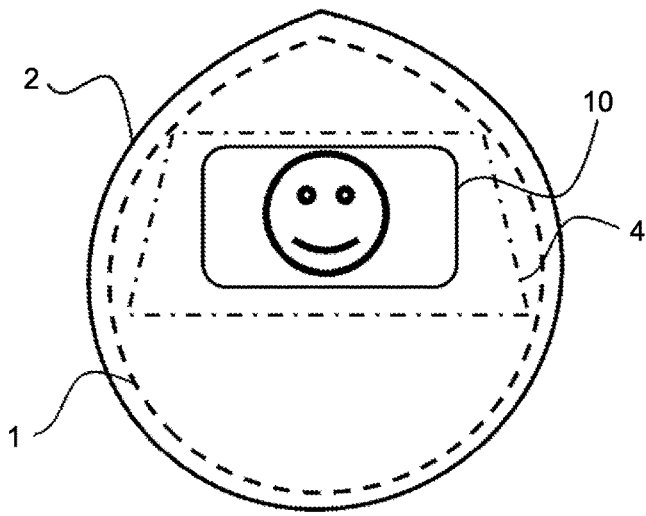
FIG. 1 is a schematic diagram of a communication robot according to some embodiments of this disclosure.

The communication robot according to the embodiments of this disclosure includes, as illustrated in FIG. 1, an egg-shaped housing 1, an outer cover 2 covering the housing, a display 10 displaying facial expression, and an input unit 4. However, the communication robot is not limited to the egg-shaped one. The communication robot may have any shape of, for example, a sphere, a rectangle, a star, and a Dharma (snowman) shape.

The housing 1 has, for example, a shape like an egg. The housing 1 has a space for incorporating therein a circuit board, various control sensors, and the like. The material of the housing 1 may be, for example, plastic and polycarbonate resin. Moreover, the material of the housing 1 may be made of metal such as aluminum, stainless steel, and titanium. The housing 1 will be explained for the case where legs are not provided in order to facilitate rolling, however, the embodiments are not limited thereto. For example, the housing 1 may be provided with legs.

The outer cover 2 made of resin can be made of resin such as silicone which is softer than the material of the housing 1. The outer cover 2 covers the periphery of the housing 1 in order to absorb the impact and protect the housing 1. The outer cover 2 has an opening in a portion corresponding to the display 10. The opening of the outer cover 2 is designed to expose the display 10. However, the outer cover 2 may be provided so that the display can be visually recognized from the outside without providing the opening. For example, the outer cover 2 may be made of a transparent resin only for the portion of the display 10. In this case, a waterproof structure is easily implemented on the outer cover 2.

Figure 2:
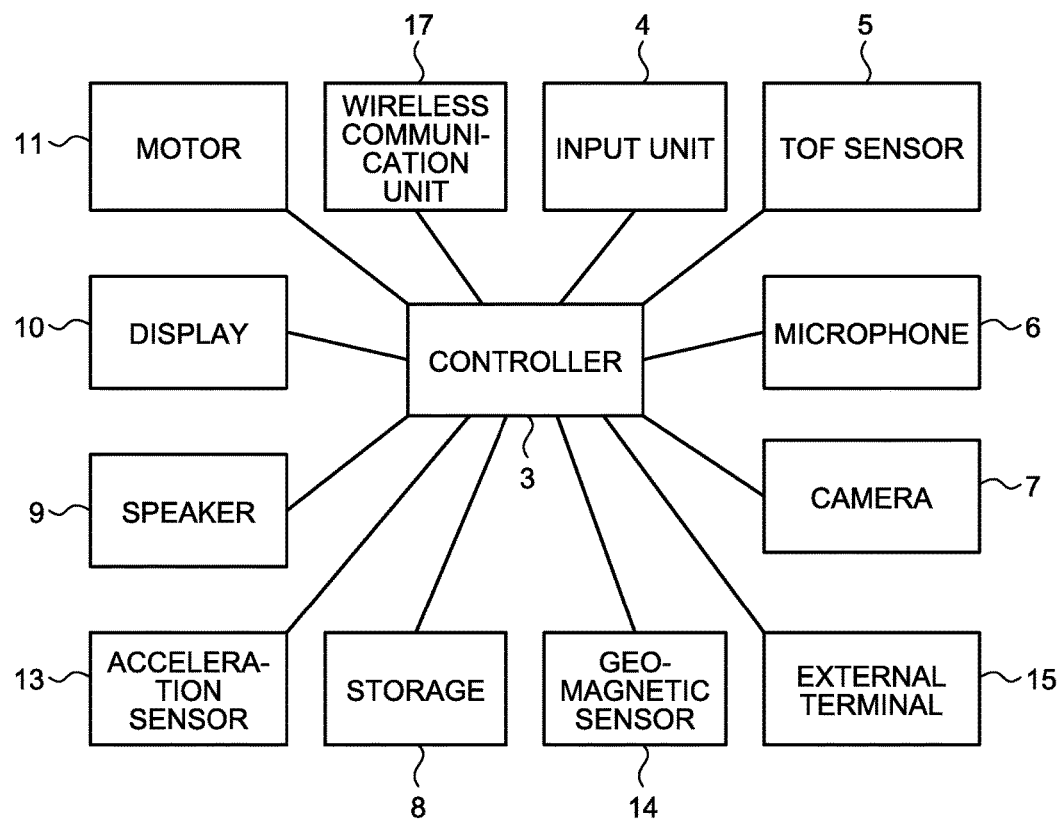
FIG. 2 is a functional block diagram of the communication robot according to the embodiments of this disclosure.

As illustrated in FIG. 2, the communication robot includes a controller 3, a speaker 9, and various sensors having respective functions, and the like.

Details thereof will be explained below.

The controller 3 can execute various motions based on various inputs from the sensors and various pieces of information in a storage 8. The sensors include, for example, the input unit 4, a microphone 6, and a camera 7. The various motions include those in, for example, the speaker 9, a motor 11, and the display 10. The various inputs, information, and the motions corresponding thereto will be explained later.

The input unit 4 is used for various settings and information input. The input unit 4 is a touch sensor as an example. For example, the input unit 4 may be configured so that a part of the touch sensor is overlapped with the display 10 to partially form a so-called touch panel. For example, the input unit 4 may be operation buttons provided with operation keys. For example, a removable keyboard or the like may be used as the input unit 4. The communication robot may include an external terminal 15. The external terminal 15 may be provided on, for example, the underside or the back of the housing 1. The back includes, for example, the back side of the communication robot. The external terminal 15 may be used to input information in the storage 8. The external terminal 15 may be used to output information from the storage 8. An external device such as a keyboard and an external memory may be removed from the external terminal 15 during normal use. For example, the communication robot may arrange touch sensors around the housing 1. In this case, the communication robot can detect an act that a user lifts the communication robot. The touch sensors may be arranged on the left and right of the housing 1, that is, locations corresponding to both sides of the communication robot. For example, the touch sensors may be arranged over the entire circumference of 360° of the housing 1. For example, the touch sensors may be provided with several arrangement areas at a predetermined angle. The arrangement area includes, for example, a half circumference area such as 180°. The arrangement area includes, for example, an area of 45° or 60° in the half circumference.

A TOF sensor 5 and the camera 7 are image system sensors. The TOF sensor 5 and the camera 7 can capture surroundings where the communication robot itself is placed, the position and facial expression of a person, and the like, individually or in cooperation with each other. For example, the TOF sensor 5 can easily acquire shape information and distance information of an object at the same time. The object includes, for example, a person such as adult, infant, and toddler. The communication robot may read facial expression of a person and a direction of his/her eyes using, for example, the camera 7 in addition to so-called face recognition. The communication robot may acquire, for example, an approaching distance at any time with the TOF sensor 5. The communication robot can calculate a moving speed from a difference in distance to an approaching person and an elapsed time. The difference in distance includes, for example, a difference between the distance measured last time and the distance measured this time. The elapsed time includes, for example, the elapsed time from the previous measurement to the current measurement. The communication robot can distinguish whether the approach is, for example, running up thereto, slow approaching, or approaching with caution based on the calculated moving speed. The communication robot can also store the result of distinction as the approach information in the storage 8. The communication robot may acquire, for example, an image and distance information from the camera 7. In this case, the distance information can be easily acquired by autofocus technology. The communication robot may monitor the front thereof by the camera 7 and the rear thereof by the TOF sensor 5. One or more of either the camera 7 or the TOF sensor 5 may be used for the communication robot.

The microphone 6 can collect surrounding sounds and sounds emitted by people. For example, the communication robot cannot predict from which direction a person talks to the communication robot. For example, the communication robot does not know in advance from which direction a person utters the voice with respect to the sound emitted by the communication robot. Therefore, the communication robot is preferably provided with the microphone 6 having wide directivity beforehand. Moreover, the communication robot may arrange the microphone 6 on the left and the right of the face (i.e., the display 10). For example, the communication robot cannot capture a person behind the communication robot with the image system sensor such as the camera 7 and the TOF sensor 5. However, the communication robot can recognize the direction of the person behind the robot by the sound image localization by microphones 6 provided on the left and the right thereof.

The storage 8 stores basic information. The basic information includes, for example, information input by a guardian through the input unit 4. The basic information includes the information previously stored in the storage 8. For example, basic information is gender, age (age in month), name of infant, etc., being a user, name of a guardian, personality, preference, region information for place of residence, native language information, and other target language information. The personality includes, for example, active, shy, and dynamic. The preference includes, for example, music, figures, and characters in animations. The native language information includes, for example, the native language information of a close guardian such as father and mother. For example, when the personality and the preference can be qualitatively read from various pieces of reaction information, which are explained later, the communication robot may read these data as the basic information. For example, the communication robot can detect rapid approaches to the communication robot several times with respect to different types of motions performed by the communication robot, from the reaction information. When detecting the rapid approach, the communication robot may store the information that the person is active as the basic information. In this case, the communication robot may select hereinafter a motion appropriate for active type infant, etc.

The storage 8 also stores emotional information of the user beforehand. The emotional information includes, for example, approach information and facial expression information. The facial expression information includes, for example, information for someone's smiling face, angry face, and sad face. The emotional information may include, for example, emotional information of a user's guardian and brothers and sisters. In other words, the storage 8 can store comparison information for determining which emotion the person is currently expressing from the face of the person such as the user. The storage 8 can newly store the acquisition of expressed "laugh" and "sorrow" from the person's face in response to a motion of the communication robot, as reaction information (facial expression), in association with the motion. The storage 8 can newly store the approach as reaction information (approach) in association with the motion. The communication robot may store, for example, reaction information (facial expression) such as "laugh" and "anger" acquired immediately after the motion output from the speaker 9 or the display 10 in association with the reaction information (approach) when the user approaches the communication robot. The communication robot may replace previously stored ordinary person's smiling face with user's smiling face and set the replaced smiling face as the emotional information for comparison and determination. The facial expression information such as the ordinary person's smiling face does not have to be deleted from the communication robot assuming the case that other users may use the communication robot after the user uses it.

Figure 4:
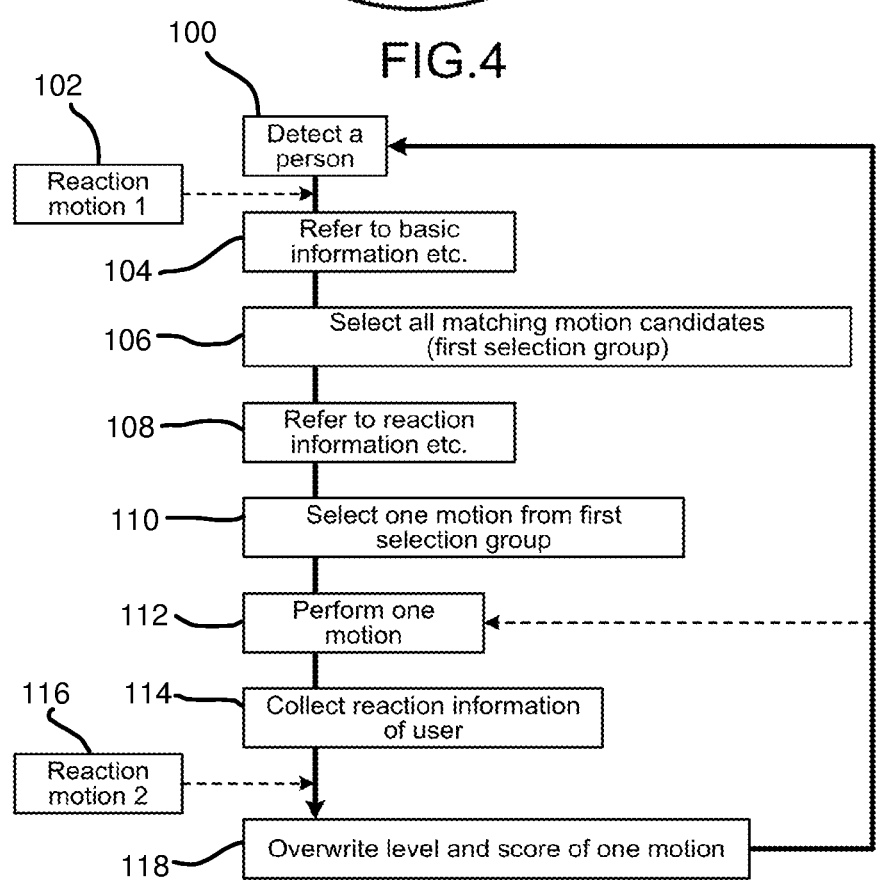
FIG. 4 is a diagram illustrating motion contents of the communication robot according to the embodiments of this disclosure.

The storage 8 stores various motions performed by the communication robot. Classification information indicating property corresponding to the basic information is given to each of the motions. The classification information may include information indicating that a motion is for the infant, etc., aged, for example, one month to four months. The classification information may also include information indicating that a motion is for the infant, etc., aged, for example, five months to eight months. The classification information may include information indicating that a motion is for the infant, etc., aged, for example, nine months to twelve months. The classification information may include information indicating that a motion is for the infant, etc., aged, for example, one year old to two years old. The classification information may include information indicating that a motion is for the infant, etc., aged, for example, three years old to four years old. The classification information may include information indicating that a motion is for the infant, etc., aged, for example, five years old to six years old. The classification information may include information indicating that a motion is, for example, for boys or for girls. The classification information may include information indicating that a motion is, for example, for the guardian or brother/sister of the user as a target. The classification information may include information indicating that a motion is, for example, for a person living in a Japanese-speaking country. The classification information may include information indicating that a motion is, for example, for a person living in an English-speaking country. The classification information may include information indicating that a motion is, for example, for a person whose target language is Japanese. The classification information may include information indicating that a motion is also for the infant, etc., aged, for example, five months to eight months. The classification information may include information indicating that a motion is, for example, for a person whose target language is English. The classification information may include information indicating that a motion is also for the infant, etc., aged, for example, five months to eight months. The classification information may include information indicating that a motion is, for example, for a person whose target language is French. As illustrated in FIG. 4, the communication robot can refer to the basic information and the classification information 104 to select one or more corresponding motion candidates 106 (selected motions may be called "first selection group"). When there is one corresponding motion candidate, the communication robot only has to execute the motion.

Figure 5:
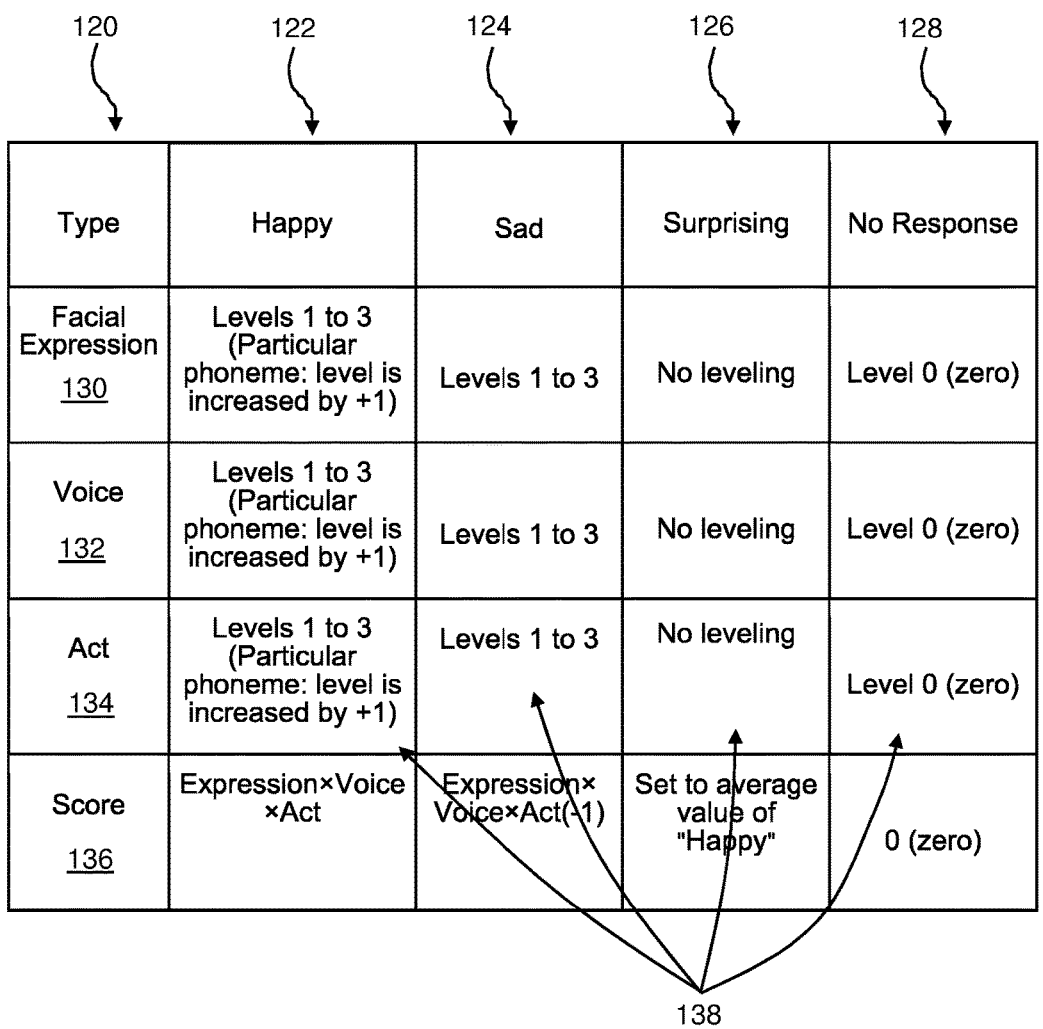
FIG. 5 is a diagram illustrating the concept of reaction information of the communication robot according to the embodiments of this disclosure.

The storage 8 stores reaction information which is explained later. The reaction information includes (see FIG. 5) information such as a type of reaction 120, an intensity level of reaction in each type, and a score 136 calculated from the intensity level. As explained above, when there is a plurality of motions as candidates, the communication robot may determine whether to execute any one of the motions from the first selection group by referring to the reaction information and environmental information or the like, explained later.

The speaker 9, for example, informs necessary information by sound, emits music sound, or calls persons. The communication robot may use a directional speaker so that a sound is directed toward a specific target person or toward a specific direction.

As illustrated in FIG. 1, the display 10 displays the facial expression formed from parts of a face as parts of the face of the communication robot. The display 10 may be used as a display for various settings and inputs. Therefore, the display 10 can display reproduced moving images, static images, and characters in addition to the display of the face. The display 10 may be, for example, an LCD or an organic EL.

Figure 3:
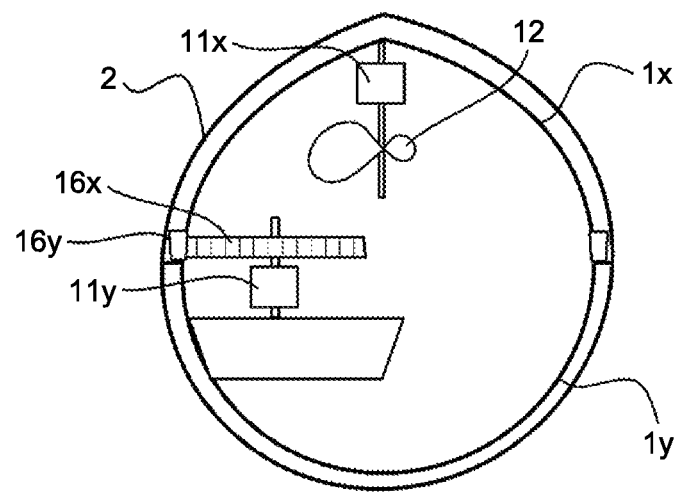
FIG. 3 is a cross sectional diagram of the communication robot according to the embodiments of this disclosure.

A motor 11x and an eccentric weight 12 are configured as a drive mechanism that changes an orientation of the communication robot. As exemplified in FIG. 3, a lower portion 1y of the housing 1 is rounded. The motor 11x and the eccentric weight 12 are installed in an upper portion 1x of the housing 1, so that the housing 1 is swung by the motor 11x and the eccentric weight 12. The motor 11x is made to rotate around a shaft center along the vertical direction of the housing 1 inside the housing 1. The eccentric weight 12 mechanically connected to the rotating shaft of the motor 11x rotates back and forth and right and left. As a result, the communication robot generates a moment in the housing 1, and makes a gesture such that the communication robot rolls. The communication robot is not limited to the combination of the motor 11x and the eccentric weight 12, and various drive mechanisms can be adopted. For example, the drive mechanism may be a pair of tires or rollers or the like.

The communication robot can capture the orientation and the motion of the communication robot at any time by a geomagnetic sensor 14 and an acceleration sensor 13. The communication robot may further readjust the output of the motor 11x from the captured information. Such a configuration is effective in a case where it is desired to be moved by a required amount regardless of whether the communication robot is placed on a wooden floor or placed on a carpet or a tatami mat.

A motor 11y fixed to the lower portion 1y of the housing 1 may be configured so that the rotational force thereof is transmitted to a gear 16y fixed to the upper portion 1x of the housing 1 via a gear 16x and that the upper portion 1x of the housing 1 is rotated with respect to the lower portion 1y by the gears 16x and 16y. For example, the gear 16y may be formed by cutting teeth on the inner peripheral surface of the upper portion 1x of the housing 1. For example, the gear 16y may be a gear fixed to the upper portion 1x of the housing 1 and having teeth on its inner peripheral surface.

The acceleration sensor 13 can be used to learn the state of the communication robot itself, i.e., its moving state or its falling state or the like. The geomagnetic sensor 14 can be used to learn its orientation by detecting a direction of the communication robot itself. The communication robot may store the information of the geomagnetic sensor 14 together with, for example, a direction from which a someone's voice is heard and a direction in which someone is present. A wireless communication unit 17 performs wireless communication with an external electronic device.

An example of the motions of the communication robot according to this disclosure will be explained next with reference to FIG. 4 and so on.

In the present specification, a particular phoneme which is explained later, or a word including the particular phoneme, or talking with sentences including words that include the particular phoneme, or a sound including a song or the like that includes the particular phoneme may be described as particular phoneme. In the present specification, a case including various other sounds in addition to the particular phoneme may be described simply as sound or as sound including a particular phoneme.

The communication robot utters a particular phoneme exemplified as follows and a sound including the particular phoneme as a motion of the communication robot. The particular phoneme may include, for example, a phoneme that does not originally exist in supposed native language users. In other words, when a user's mother tongue (first language) is Japanese, the particular phoneme may include any phoneme not used in Japanese. The particular phoneme may include, for example, a phoneme of a second language that cannot be distinguished by adults although the phoneme exists in the mother tongue. That is, the particular phoneme is a combination of phonemes that are not distinguished from a similar phoneme, and includes phonemes used in other languages (second language) as a target.

For example, when a native language registered in the storage 8 is Japanese, these phonemes include /l/ and /r/, etc., which are not distinguished in Japanese but are distinguished in English or so. The phoneme includes /h/, etc., for example, when a person whose native language is French selects Japanese as a target language. The phoneme includes /ɛ/ and /e/, etc., for example, when a person whose native language is Korean selects Japanese as a target language. Moreover, the communication robot may constitute sounds that are emitted from a sentence including only phonemes which are difficult to be distinguished or only words containing these phonemes.

As shown in FIG. 4, the communication robot according to this disclosure can detect the presence of a person 100. The communication robot may detect the presence of a person 100 by using, for example, either one of or both of the camera 7 and the TOF sensor 5. For example, when a person is nearby, the communication robot may detect whether the person is a user as a target to whom a particular phoneme should be heard. For example, the communication robot may check whether the person is not an adult but an infant or a toddler. The communication robot may collect sounds of an infant or a toddler (hereinafter, described as infant, etc.) by at least one of the camera 7 and the microphone 6 and detect the presence 100 thereof. The communication robot may specify who the infant, etc., is. The communication robot may change the sound to be emitted for each specified person. At that time, when the image system sensor such as the camera 7 is used, the communication robot may specify a person from the registered face photograph or the like of the user and verify the person. When the microphone 6 is used, the communication robot may record voiceprints and voice characteristics of persons close to the user such as the user himself/herself, guardians, and brothers and sisters in the storage 8 in advance, and perform person verification.

When the presence of the person can be checked or the person can be specified, the communication robot may generate a particular phoneme or a sound as a reaction motion 1 102 indicating that the person is present or the specific person can be checked based on the information as a condition. The reaction motion 1 102 may be performed in response to detection of the person 100 regardless of who the person is, i.e., regardless of the basic information 104. Furthermore, the communication robot may generate a particular phoneme or a sound based on the basic information 104 when the person registered in the storage 8 can be detected.

The communication robot refers to the basic information 104 and then selects one or more matching motion candidates 106 (first selection group). The formation of the first selection group is based on, as explained above, the classification information of the motions. Moreover, the communication robot refers to the reaction information 108 associated with each of the motions, selects 110 a motion candidate whose intensity level 138, explained later, is the highest or in which score 136 calculated therefrom is the highest, from the first selection group, and executes the selected one as one motion 112.

The communication robot preferably detects the reaction of the infant, etc., when the sound is emitted as one motion 112 by the camera 7, the microphone 6 or the like in order to collect the reaction information 114. As exemplified in FIG. 5, the reactions of the infant, etc., may be classified to four types 120 of, for example, Happy 122 (including laughing), Sad 124 (including crying), Surprising 126, and No response 128, and stored in the storage 8. The reactions of the infant, etc., may include a type 120 such as "angry" (not shown). Furthermore, the communication robot may divide the intensity levels 138 of "happy 122 (including laughing)" and "sad 124 (including crying)" into, for example, three levels respectively and store them in the storage 8 as reaction information. Specifically, the communication robot records the facial expression 130 of the infant, etc., when the communication robot emits a sound, and determines the type 120 and the intensity level 138. For example, in the determination of the three intensity levels 138 in the type 120 of "happy 122 (including laughing)", the highest level 3 is laughing such that the infant, etc., most greatly opens the mouth. The level 2 in the type 120 of "happy 122 (including laughing)" is a case in which the infant, etc., laughs with open mouth but an opened area of the mouth is smaller than that of the level 3. The level 1 in the type 120 of "happy 122 (including laughing)" is a case in which the infant, etc., laughs but the opened area is smaller than that of the level 2. "No response" 128 is a case in which the infant, etc., does not laugh. In this case, the level is 0 (zero). Alternatively, the communication robot may determine the level according to how the corners of the mouth are upward. The communication robot may use the emotional information for level classification.

In the communication robot, the number of repeats of only the particular phoneme will not be increased only by ranking user's reactions. It is needless to say that the communication robot stores words or the like including particular phonemes in a target language among all the words (sounds) stored in the storage 8 at a higher rate than that of a case where these words are used for normal conversation. Therefore, the communication robot is likely to emit sounds including the particular phonemes than normal conversation just because of that, but can also increase the frequency thereof. For example, the communication robot may mechanically increase the level by 1 with respect to the motion of the communication robot including the particular phonemes. For example, upon acquisition of the facial expression 130 by the camera 7, the communication robot may set the type 120 of "happy 122 (including laughing)" to the level 2 because of the particular phonemes included although the type 120 of "happy 122 (including laughing)" is the level 1.

The communication robot may determine, for example, the three intensity levels 138 in each type 120 by the type and volume of the voice 132 uttered by the infant, etc. For example, if it is a child's laughter, and when the child is "shrieking" with laughter as a response to the motion of the communication robot, the communication robot sets the type 120 of "happy 122 (including laughing)" to the level 3. When a sound like "A-" or "U-" is made as a response to the motion, the communication robot sets the type 120 of "happy 122 (including laughing)" to the level 2. When there is no sound with respect to the motion, the communication robot sets the type 120 to the level 1. Alternatively, the communication robot may set a case, where a child utters a sound similar to the sound emitted by the communication robot so as to imitate the sound, to the level 3 or a level 4 which is a higher level. The communication robot can store the determined level in the storage 8 as the reaction information. Similarly, the communication robot may raise the level of only the particular phoneme.

About acts of an infant, etc., the communication robot may also set a case, where the infant is approaching, to the intensity level 3 as the type 120 of "happy 122 (including laughing)", set a case of an act 134 like waving both hands up and down to the intensity level 2, set a case where the infant, etc., stops after he/she seems to be approaching a little to the level 1. For example, when the age is nine months or 10 months, the infant, etc., can crawl. Therefore, when the infant, etc., is approaching, the communication robot may further divide the intensity level 138 into details according to the speed of crawl during the period from nine months to 13 months in which the infant, etc., can independently walk (which does not mean that he/she holds on things to stand up). For example, the communication robot may set a case where the speed of crawl is quick upon approaching to the intensity level 4, and may maintain the intensity level 3 when the speed of crawl is slow. Likewise, the communication robot may divide the intensity level 138 by the speed of walking when the infant, etc., is approaching after 13 months when he/she can walk alone. Similarly, the communication robot may raise the level of only the particular phoneme.

Then, in each of the three elements such as facial expression 130, voice 132, and act 134, the communication robot stores the score 136 obtained by being multiplied by the three elements, as 1 for the intensity level 1, 2 for the intensity level 2, 3 for the intensity level 3, and 4 for the intensity level 4. For example, the communication robot should multiply the scores 136 for various motions or adds the scores 136 and preferentially execute in dialogue the motion of the communication robot with a higher score 136 of "happy 122 (including laughing)". However, in the case of a reaction to the motion including the particular phoneme, the communication robot may raise the score 136 by 10, for example, and store the score 136, unlike in the case of a motion not including the particular phoneme. This results in an increase in the number of repeats of the motion including the particular phoneme in the communication robot. The score 136 is stored in the storage 8 in association with the motion as the reaction information. Here, the motion of the communication robot can include, for example, a swing of the housing 1 and a change of the face displayed on the display 10 in addition to the motions of the speaker 9 such as a motion of emitting a particular phoneme and a motion of emitting a sound. The communication robot can store the intensity level 138 or the score 136 with respect to the most recent motion. When the motion is executed, the communication robot can overwrite 118 the previous intensity level 138 or score 136 of the executed motion with this intensity level 138 or score 136. Thereby, in the communication robot, when the reaction of the infant, etc., lowers (infant's interest has gone out) because, for example, the same motion is executed many times, the relative level or score 136 of the motion decreases and other motion moves upward instead. Therefore, the communication robot allows the other motion to be preferentially and easily executed. As a result, the communication robot can present fresh motion, and it is therefore possible to reduce that the infant, etc., loses interest in the communication robot.

The communication robot can classify a motion that has never been executed before, as the type 120 of "happy 122 (including laughing)" and set the score 136 of the motion. For example, the communication robot can set the score 136 to 33 which is an arithmetic average value of a minimum value (1) and a maximum value (e.g., 64(=4×4×4)) in a range that can be set as a score 136. The arithmetic average value is hereinafter called "average value". When the average value is not an integer, the communication robot should set the score 136 to a larger integral value. Therefore, initially, because all the motions have no order, the communication robot may sequentially execute through all the motions. When the order is determined, the communication robot may selectively perform the motion accordingly.

In the intensity level 138 determination of "sad 124 (including crying)", for example, a case, in which the downturn of the corners of the mouth and closing of eyes occur simultaneously which are viewed from the camera 7, may be set to the intensity level 3. In the intensity level 138 determination of "sad 124 (including crying)", for example, a case, in which the corners of the mouth are downturned but the infant, etc., does not cry nor close the eyes, may be set to the intensity level 2. In the intensity level 138 determination of "sad 124 (including crying)", for example, a case in which the corners of the mouth are downturned a little may be set to the intensity level 1. As for the intensity level 138 determination of "sad 124 (including crying)", for example, the voice 132 is captured by the microphone 6 and the intensity level 138 may be determined by the magnitude of the voice 132. In this case, the intensity level 138 determination of "sad 124 (including crying)" may be performed by simply dividing the intensity level 138 with sound pressure. In the case of "sad 124 (including crying)", the communication robot stores a value obtained by multiplying the value of the intensity level 138 of facial expression 130 by the value of the intensity level 138 of a cry and further appending minus to the product of the scores 136 obtained from the values. For example, when the facial expression 130 is the intensity level 2 and the voice 132 is the intensity level 2, the score 136 stored in the storage 8 is minus 4. The motion appended with the minus intensity level is rarely used thereafter, however, after a certain date, for example, two months or more has elapsed since the storage of the intensity level, the motion may be reset again to the average value. Alternatively, the motion appended with the minus intensity level may be performed again regardless of the stored score 136 after two months or more has elapsed. Alternatively, the motion appended with the minus intensity level may be performed again after the age reaches certain months. This is because the infant, etc., may no longer have fear of the same motion because of changes in what scares him/her as the age progresses and because of the affinity for the communication robot itself. This makes it easier for the communication robot to ensure diversity of motion. In addition, the communication robot may be configured so that the higher the minus score is, the longer the period is made until the motion is reset to the average value. For example, when the score 136 is minus 4, the communication robot may set the period to 2 months to reset the motion, and when the score 136 is minus 8, the communication robot may set the period to 4 months to reset the motion.

"Surprising" 126 may be, for example, a reaction such as stop of an act during the act 134 of the infant, etc. "Surprising" 126 may be, for example, continuation of a state in which the infant, etc., stares at the communication robot for a predetermined time or more. In the case of "surprising" 126, the score 136 is plus similar to the "happy 122 (including laughing)" and the previous average value is stored in the storage 8. Therefore, the frequency of appearance of the score 136 has substantially the same as that of the motion classified as "happy 122 (including laughing)" having the same score 136 as the average value. When the scores 136 of both are exactly the same, the communication robot may select the one with the smaller number of motions.

"No response" 128 may be, for example, a case where the user continues to "not seeing at all" the communication robot or a case where the user does not even try to see the communication robot. "No response" 128 may be a case where the user does not even utter a voice. In addition, a motion which does not correspond to any type 120 may be classified as "no response" 128. In the motion classified as "no response" 128, the score 136 value is 0 (zero). Therefore, the motion classified as "no response" 128 is rarely used thereafter, however, after two months or more has elapsed since the classification, the motion may be reset to the average value of the motion classified as the "happy 122 (including laughing)". Alternatively, the motion classified as "no response" 128 may be performed again after two months or more has elapsed. Alternatively, the motion classified as "no response" 128 may be performed again after the age reaches certain months. This is because the infant, etc., may react to those to which he/she does not react previously, as the age progresses, or may react to those to which he/she does not react previously, because of the affinity for the communication robot itself. This makes it easier for the communication robot to ensure diversity of motion.

Upon detecting a reaction of the infant, etc., when voice 132 is emitted as one of the motions, the communication robot may perform a reaction motion 2 116 as a reaction of the communication robot to the person's reaction. For example, when an approach can be checked, the communication robot may generate a particular phoneme or a sound based on the distance information of the person to the communication robot. In other words, the communication robot may perform the reaction motion 2 116 after collection of the reaction information 114 of the user. Moreover, upon detecting that the infant, etc., sees the communication robot based on detection of the facial expression 130 by the camera 7, the communication robot may generate a particular phoneme or a sound as a motion of the communication robot. When the infant, etc., touches or picks up the communication robot, the communication robot may generate a particular phoneme or a sound as a motion of the communication robot. In this case, the communication robot may detect an act 134 that the infant, etc., is picking up the communication robot by the touch sensor. For example, the communication robot may detect the act 134 due to the hands of the infant, etc., touching the left and right sides of the housing 1 in touch sensors arranged in a planar shape around the housing 1. Alternatively, the communication robot may previously store an acceleration produced in the acceleration sensor 13 when the communication robot is picked up, and detect that the communication robot is picked up from the acceleration produced in the acceleration sensor 13. Upon detecting the act 134 of the infant, etc., the communication robot may generate a particular phoneme or a sound as a motion of the communication robot. Such a reaction motion 2 116 may be performed irrespective of the reaction information stored in the storage 8. In other words, the communication robot may simply perform a specific motion associated with a particular reaction of the infant, etc. This may be repeated several times when there are motions associated with the reaction of the infant, etc. In other words, the repetition of the motions is performed in such a manner that the communication robot performs one motion 112, performs the motion, as the reaction motion 2 116, corresponding to the reaction of the infant, etc., obtained by reacting to the one motion 112, and further performs the motion, as the reaction motion 2 116, corresponding to the reaction to the reaction motion 2 116.

A more specific example will be represented below. When a first detection 100 is "detection of the presence of Ryo-kun who is a user" as a result of referring to the basic information 104 or the like, the communication robot selects a motion candidate 110 that matches the basic information 104 as an internal operation of the communication robot. Then, when the user shows the greatest response to the call as compared with other motions of the robot from the reaction information in the past, the communication robot emits a first sound (one motion 112). The first sound contains, for example, "Hi, Ryo-kun, How are you?". Then, as a second detection, when detecting that "the user smiles" which is a response of the infant, etc., to the first sound, the communication robot emits a second sound as a motion of the communication robot (reaction motion 2 116). The second sound contains, for example, "Happy? Terrific!". Thereafter, when detecting an act 134 of the infant, etc., holding the communication robot, the communication robot may emit a third sound as a motion of the communication robot (reaction motion 2 116). The third sound contains, for example, "Let's sing together.". In this case, the communication robot includes a phoneme /r/ in the second sound. The communication robot also includes a phoneme /l/ in the third sound. It goes without saying that, when detecting "laugh" as the second detection, the communication robot may display a smile on the display 10 of the communication robot as a motion of the communication robot in addition to emission of the sound as the motion of the communication robot. Moreover, the communication robot may imitate the sound uttered by the infant, etc., collected by the microphone 6, etc. as a motion of the communication robot. For example, the communication robot may perform the motion only when the score 136 exceeds a specific threshold which is extremely high. The communication robot may display, for example, the face of the communication robot displayed on the display 10 as a motion of the communication robot as if the communication robot nods. In this case, for example, the communication robot moves up and down the whole face displayed on the display 10 within a display area, as a motion of the communication robot. For example, the communication robot may swing the housing 1 by the eccentric weight 12 and the motor 11x and operate as if the communication robot nods, as a motion of the communication robot.

In the case of Japanese language, the first sound as a motion of the communication robot contains, for example, "Hiroshi-kun!". In the case of Japanese language, the second sound as a motion of the communication robot contains, for example, "Hello". In the case of Japanese language, the third sound as a motion of the communication robot contains, for example, "Let's play together!". In this case, the first sound is a sentence including a phoneme /h/. This is an example that contributes to learning of particular phonemes in Japanese for a person whose native language is French.

When the motion with a high intensity level of "happy 122 (including laughing)" is performed and then the sound including the above phoneme is emitted, the communication robot may adjust times of the both. In other words, the communication robot may set the times so that a first one is set longer between cases in which the motion is performed for a first time and the motion is performed for a second time and thereafter. Of course, the communication robot may also increase a sensing time. The communication robot may continuously perform sensing. Specifically, the communication robot performs generation of the sound of "Hi, Ryo-kun." which is the motion with the high intensity level 138 of "happy 122 (including laughing)" and perform display of a smile by the display 10. Thereafter, the communication robot emits "Let's sing together." which is the next sound three to five seconds later if it is the first time. The communication robot may emit "Let's sing together." which is the next sound one to three seconds later because the time (response time) until "laugh" being the reaction of the infant, etc., becomes shorter at the second time and thereafter. This makes it possible for the communication robot not to give some time to the infant, etc., in order to prevent the interest of the infant, etc., from shifting to others due to prolonged time intervals. The communication robot may detect a laugh by the camera 7 and the microphone 6 and wait for emission of "Let's sing together.", which is the next sound, until the laughter calms down. Thereby, the communication robot reduces the concern that the emitted sound may be lost by its own laughter. When the laughter occurs as a reaction of the infant, etc., to the first sound, the communication robot may instantly display a smile on the display 10 and wait for the emission of the second sound until the laughter calms down.

When "laugh" is detected from the infant, etc., while the communication robot is singing a song, the communication robot may suspend the song and emit a sound indicating a response to the "laugh" of the infant, etc. For example, when detecting "laugh" in the middle of the song, the communication robot may emit a sound such as "You like this song? Good.". In this case, the communication robot inputs reactions of the infant, etc., obtained by the microphone 6 and the camera 7 during singing a song which is a voice output, so that the emission of sound can be achieved by processing these reactions in parallel. Also, in such a case, the communication robot can make it easier for the infant, etc., to hear the sound including a phoneme in a state in which the interest of the infant, etc., is directed to the communication robot.

The intensity level 138 is provided for the reaction of the infant, etc., to the particular phoneme or the sound emitted by the communication robot, however, the intensity level 138 is not limited thereto. For example, the intensity level 138 of a reaction of the infant, etc., to other motion of the communication robot may be determined. For example, in order to respond to the intensity level 138 when the communication robot smiles at the infant, etc., with the face of the display 10, the communication robot includes the motor 11 with the eccentric weight 12 inside thereof. In this case, the communication robot may perform a motion of tilting a body (housing 1) in all directions and store the intensity level when such a motion is performed. The communication robot may perform the motion of the communication robot by combining the high intensity level 138 of "happy 122 (including laughing)" in the sound with the high intensity level 138 of "happy 122 (including laughing)" in the motion. As a result, the infant, etc., is expected to show high interest in the communication robot. At this time, the communication robot may emit the sound including the above particular phoneme as response information. Alternatively, the communication robot may emit the sound including the above particular phoneme as a subsequent motion immediately after the motion of the communication robot in which the infant, etc., shows high interest. The communication robot may process these motions as the response information. That is, the communication robot can make the infant, etc., hear the phoneme in a state in which the infant, etc., is looking at the communication robot triggered by the motion of the high intensity level 138 and score 136.

A further example will be given as to what motion the communication robot will perform at which timing. As explained above, the basic information 104 and the like of the users input through the input unit 4 are stored in the storage 8. The communication robot selects any one of the motions 110 based on the user's basic information 104 or the like, but may use environmental information at this time. That is, the communication robot may include location information where the infant, etc., as a user is present, current time information, behavior information of the infant, etc., weather information, season information, peripheral person information, and the like. The location information includes, for example, information for a bed, a living room, a home garden, and outside of the home. The behavior information of the infant, etc., includes, for example, information indicating that he/she is eating, sleeping, or is playing with somebody. The peripheral person information includes, for example, information indicating whether a guardian is near the infant, etc., or is in the same space, or indicating who is near the infant, etc., (mother, father, grand parents, brother, etc.). The communication robot may store the environmental information in the storage 8 in addition to the basic information 104 and the approach information described above. Then, for example, when there is no difference between the basic information and the approach information but there is a difference in the environmental information, the communication robot may emit a different sound for each environment.

For example, when it can be determined that the infant, etc., is on the bed or in the bed room in the environmental information, the communication robot may emit a sound with a low sound pressure or at a slow, gentle speed as compared with a sound when the infant, etc., is in the living room. This makes it possible for the communication robot to prevent the infant, etc., from hindering sleeping caused by unnecessarily exciting the infant, etc., before going to bed. The communication robot may reduce the number of times of emitting the sound than the case in which the infant, etc., is in the living room or the like. The communication robot may emit a lullaby as a sound. In addition, when it can be determined that the brother is near the infant, etc., the communication robot may perform calling by name together with the brother's name instead of calling the infant, etc., by his/her single name unlike the case in which the brother is not near the infant, etc. In this way, the communication robot can also create a new sound as a motion. This makes it possible for the communication robot to reduce the decrease in the user's interest in the communication robot as the time elapses. As a result, by using the communication robot for a long time, it is easy to promote the development of hearing of the infant, etc., and it is easy to suppress the decline of listening ability.

The communication robot may perform a motion of not performing level determination, separately from the motion as a target of the level determination. For example, the housing 1 of the communication robot is separated into the upper portion 1x and the lower portion 1y, and may operate so that the upper portion 1x is rotated with respect to the lower portion 1y. For example, when the voice 132 of the infant, etc., from behind the communication robot is captured by the microphone 6, the communication robot rotates only the upper portion 1x by the motor 11 without motion of the lower portion 1y so that its face can be directed to the rear side thereof. In this case, the outer cover 2 of the communication robot is previously separated between the part covering the upper portion 1x and the part covering the lower portion 1y. The communication robot can keep the face always facing the infant, etc., by following the direction in which the infant, etc., is moving by crawling. Moreover, the communication robot may perform a motion of blinking when the infant, etc., is looking at the communication robot. When the guardian, etc., says "Good Morning", then the communication robot may respond by saying "Good Morning". Conversely, when capturing the guardian, brothers, and sisters, etc., by the camera 7, the communication robot may say "Good Morning" to them. When there are two or more communication robots, the communication robots may talk to each other. In this case, the communication robot may treat the other communication robot as a temporarily registered infant, etc., and execute the same set motion as that for the infant, etc. As a result, a special motion for a pair of communication robots does not have to be designed for the communication robot. Alternatively, for the communication robot, an environment may be created so that two or more communication robots are made to talk to each other based on a previously set scenario and the infant, etc., looks at them.

The facial expression of the communication robot may be configured only with preset eyes and mouth, however, average values (coordinates) of outlines of the parents who are guardians may be captured. In this case, in the communication robot, the position between both eyes is set to 0 (zero), the left and the right are digitized with plus and minus coordinates, and further the average value of the parents of the numerical value is taken. Thereafter, in the communication robot, an average value (sum of lengths of parents/2) of the length from the nose to the chin is multiplied by 0.8, so that the length from the nose to the chin may be decreased. Furthermore, in the communication robot, an average value (sum of lengths of parents/2) of the length (approximately forehead length) from the eyebrows to the hairline is multiplied by 1.1, so that the length may be increased. As a result, the communication robot can be similar to the parent's face and make the face look younger. Likewise, the communication robot may make the voice emitted by the communication robot similar to the voice of the mother or to the voice of the father. The communication robot may make the voice of the father sound younger by increasing the frequency of the father's voice. By using such a voice, the communication robot can increase the affinity.

When the user is an infant and a toddler, and when viewing video on a TV screen together with the infant and the toddler, the communication robot may show a reaction to the detail of contents. For example, when a funny scene appears, the communication robot may emit a sound of "Funny!" while displaying a laughing expression on the display 10. Learning the detail of the contents may be performed from the tag given to the contents. Acquisition of tag information by the communication robot may be performed by, for example, the wireless communication unit 17 acquiring those transmitted from an external display device such as TV via wireless communication. Alternatively, the communication robot may temporarily receive both the content information and the tag information from an external service, etc. via the wireless communication unit 17 and the external terminal 15 and transmit the content information to the external display device such as TV.

Alternatively, when a tag indicating that there is, for example, a laughing scene in an image is to be displayed, the communication robot may capture the displayed tag by the camera 7, so that a mechanism that makes the communication robot laugh may be created. Alternatively, instead of the tag of the image, a high frequency sound outside the audible range of human beings, for example, 25 kHz may be output from the speaker for a predetermined time. In this case, in the communication robot, when the high frequency sound is captured by the microphone 6, the mechanism that makes the communication robot laugh may be created. The communication robot may associate types of sound pitches with types of tags, such as 25 kHz for laugher and 30 kHz for sorrow.

The communication robot may acquire reaction information to each motion into the server via the external terminal 15 or the wireless communication unit 17 and take an average value of the scores 136 or the like sampled from infants, etc., having different reactions to the same motion in the server. The communication robot may store again a score table based on the average value in the storage 8 of the communication robot via the external terminal 15 or the wireless communication unit 17. The communication robot can upgrade the application. As a result, the communication robot can select an effective motion based on the reactions of many users and operate it at all times. In addition, motions with the strong negative factors such as sadness may be deleted from a motion list and then distributed to each communication robot.

In the above description, for the communication robot, the face recognition and reading of facial expression 130 performed by using the camera 7 and the estimation of gaze direction have been described. After the person is identified by face recognition, if there is a change in other parts, for example, clothes and hair style, the communication robot may refer to this point. Specifically, the communication robot stores the image of the person captured by the camera 7 to be used for subsequent person identification. When the person identification is performed next and the person is identified by face recognition (person identification completed) but there is a change in clothes around the face or in hair style, the communication robot may speak to the person, "That hairstyle is cute!" or the like. The communication robot may perform this motion as the reaction motion 1 102, but may perform this motion at some other timing.

The communication robot may include, for example, a temperature sensor, a humidity sensor, an illuminance sensor, instead of the sensor group. The communication robot may output a sentence corresponding to, for example, "It is hot today!" depending on the contents detected by, for example, the temperature sensor, the humidity sensor, or the illuminance sensor.

It goes without saying that various combinations of the motions, various conditions, and the like described above can be made between the described contents.

The invention claimed is:

1. A communication robot comprising:
   a housing;
   a speaker;
   a storage; and
   a controller, wherein
   the storage is configured to store first information including information for a native language of a user and information regarding a country of residence, and second information indicating a plurality of intensity levels of the user's response corresponding to a plurality of motions of the communication robot, respectively, and
   when a motion of the communication robot is a motion of emitting a sound including a particular phoneme that is based on a language of the country of residence that is not found in the native language of the user, the controller is configured to increase an intensity level corresponding to the motion of emitting a sound including the particular phoneme, and perform the motion of emitting a sound including the particular phoneme at an increased number of repeats based on the increased intensity level.

2. The communication robot according to claim 1, wherein the motion is determined based on information of the storage.

3. The communication robot according to claim 1, wherein the storage stores user's name information and user's age information, or stores user's name information and age information.

4. The communication robot according to claim 1, wherein the storage stores user's emotional information.

5. The communication robot according to claim 1, wherein the storage stores environmental information on environment around a user.

6. The communication robot according to claim 1, wherein the storage stores user's face information.

7. The communication robot according to claim 1, wherein the storage stores user's voice information.

8. The communication robot according to claim 1, wherein the storage stores voice(s) of either one of or both of a user's guardian and user's brother and sister.

9. The communication robot according to claim 1 comprising:
   a sensor, wherein
   the motion of emitting a sound including a particular phoneme is performed according to information from the sensor,
   wherein the intensity level is an emotional intensity level, and wherein the emotional intensity level of a reaction of a person is determined from among a plurality of levels of emotional intensity other than no indication of a particular emotion.

10. The communication robot according to claim 9, wherein the sensor includes a touch sensor arranged on a side portion of the housing.

11. The communication robot according to claim 9, wherein the sensor is an image system sensor and detects presence of the person or identifies the person according to information of the image system sensor.

12. The communication robot according to claim 9, wherein the sensor includes one or more microphones, and detects presence of the person by the microphone.

13. The communication robot according to claim 12, wherein the person is identified based on a sound collected by the microphone.

14. The communication robot according to claim 12, wherein the microphone is provided on the left and right sides of the housing, a display is provided on the front face of the housing, a sound source direction is specified by the left and right microphones, and the sound is emitted toward the direction.

15. The communication robot according to claim 9, wherein the reaction of the person after emission of the sound is captured by the sensor.

16. The communication robot according to claim 15, wherein the captured reaction of the person is classified by type.

17. The communication robot according to claim 16, wherein the type includes "happy" and "sad" as emotions.

18. The communication robot according to claim 9, wherein the sensor includes a microphone, and the emotional intensity level is determined from a sound collected by the microphone.

19. The communication robot according to claim 18, wherein the emotional intensity level is determined by content of a voice of the person collected by the microphone.

20. The communication robot according to claim 9, wherein the sensor includes a camera, and the emotional intensity level is determined from an image captured by the camera.

21. The communication robot according to claim 20, wherein a facial expression of the person is analyzed from the image of the camera, and the emotional intensity level is determined from the facial expression.

22. The communication robot according to claim 20, wherein a behavior of the person is analyzed from the image of the camera, and the emotional intensity level is determined from the behavior.

23. The communication robot according to claim 9, wherein the sensor includes a sensor for measuring a distance and measures a speed at which the person is approaching after the sound is emitted, and the emotional intensity level is determined according to the speed.

24. The communication robot according to claim 9, wherein a response of the person, to the motion, in a plurality of different elements is captured by the sensor, and each emotional intensity level of the elements is determined.

25. The communication robot according to claim 24, wherein a score with respect to the motion is determined from the emotional intensity levels of the elements.

26. The communication robot according to claim 1, comprising:
a sensor, wherein
the sensor is an image system sensor, the motion is a first motion, and a second motion is performed only when it is determined that a person looks at the communication robot itself according to information of the image system sensor.

27. The communication robot according to claim 26, wherein the speaker is a directional speaker, the sensor includes a microphone, and the second motion is performed in a direction in which the person detected by the microphone is present.

28. The communication robot according to claim 26, wherein the sensor includes an acceleration sensor, and when an act in which the communication robot itself is lifted is detected according to information of the acceleration sensor, a sound is emitted.

29. The communication robot according to claim 26, wherein the sensor includes a touch sensor, and when a contact is detected by the touch sensor, the second motion is performed.

30. The communication robot according to claim 26, wherein the sensor includes a touch sensor provided on the left and right sides of the housing, and when contacts on both of the left and right sides are detected by the touch sensors, the second motion is performed.

31. The communication robot according to claim 26, wherein the sensor includes a plurality of types of sensors selected from among a microphone, a touch sensor, and an acceleration sensor, and different second motions are performed according to the types of the sensors and detection contents of the sensors.

32. The communication robot according to claim 26, wherein the sensor includes a microphone, and immediately after collecting a person-generated sound, the generated sound is reproduced from the speaker to imitate the person.

33. The communication robot according to claim 26, further comprising a motor, wherein the sensor includes a microphone, and a motion of swinging the housing is performed by the motor immediately after collecting a person-generated sound by the microphone.

34. The communication robot according to claim 26, wherein an approach of the person is monitored and a type of the approach is determined according to information of the image system sensor, and a second motion selected according to the type is performed.

35. A communication robot comprising:
a first sensor for detecting presence of a person and emitting a first sound when the first sensor detects the person; and
a second sensor for detecting an act of the person after the first sound is emitted and emitting a second sound when the second sensor detects a specific act, wherein
at least one of the first sound and the second sound includes a particular phoneme, and
the specific act is an act classified into joy or surprise of emotions of the person, and when the specific act can be classified as two reactions, the specific act selected is the specific act associated with a smaller number of motions.

* * * * *